US011873928B2

(12) United States Patent
Goettle

(10) Patent No.: US 11,873,928 B2
(45) Date of Patent: Jan. 16, 2024

(54) T-SLOT BAR INTERCONNECT SYSTEM

(71) Applicant: DemeGrow, Inc., Sacramento, CA (US)

(72) Inventor: Blane J. Goettle, Golden River, CA (US)

(73) Assignee: Demegrow Inc., Sacramento, CA (US)

( * ) Notice: Subject to any disclaimer, the term of this patent is extended or adjusted under 35 U.S.C. 154(b) by 0 days.

(21) Appl. No.: 17/803,696

(22) Filed: Oct. 12, 2022

(65) Prior Publication Data

US 2023/0047016 A1   Feb. 16, 2023

Related U.S. Application Data

(63) Continuation-in-part of application No. 17/300,050, filed on Feb. 16, 2021, now abandoned.

(60) Provisional application No. 62/995,891, filed on Feb. 18, 2020.

(51) Int. Cl.
*F16M 11/00* (2006.01)
*F16L 3/12* (2006.01)
*H02G 3/32* (2006.01)
*F16L 3/24* (2006.01)

(52) U.S. Cl.
CPC ............ *F16L 3/1218* (2013.01); *F16L 3/243* (2019.08); *H02G 3/32* (2013.01)

(58) Field of Classification Search
CPC .......... F16L 3/1218; F16L 3/243; H02G 3/32; Y02P 60/21
See application file for complete search history.

(56) References Cited

U.S. PATENT DOCUMENTS

| | | | | |
|---|---|---|---|---|
| 2,345,650 A * | 4/1944 | Attwood | ............. | B62D 33/044 411/105 |
| 3,429,601 A * | 2/1969 | Bremers | ................. | E04B 2/766 411/84 |
| 3,493,224 A * | 2/1970 | Graham | ................... | B25B 1/205 269/131 |
| 4,073,113 A * | 2/1978 | Oudot | ..................... | E04B 2/766 403/189 |
| 4,212,445 A * | 7/1980 | Hagen | .................... | A47B 88/43 248/245 |
| 4,467,987 A * | 8/1984 | Small | ..................... | F16L 3/223 248/68.1 |
| 4,830,531 A * | 5/1989 | Condit | .................. | F16B 37/045 403/348 |
| 6,331,092 B1* | 12/2001 | Linger | .................... | E04B 2/761 403/403 |
| 6,528,728 B1* | 3/2003 | Shima | .................. | H02G 3/0437 174/101 |
| 6,722,831 B2* | 4/2004 | Rogers | ..................... | F16B 21/02 411/553 |

(Continued)

*Primary Examiner* — Amy J. Sterling
(74) *Attorney, Agent, or Firm* — James A. Gavney, Jr.; JAG Patent Services

(57) ABSTRACT

T-slot interconnects that include a body portion and two orthogonally elongated interlock tabs positioned on opposed sides of the body portion are used for building T-bar structures, including grow-light canopies. In operation, the elongated interlock tabs are placed into T-channels of the T-slot bars and/or T-slot light bars. The T-slot interconnects are then rotated to secure the elongated interlock tabs within the T-channels of the T-slot bars and/or T-slot light bars and, thereby, secure the T-slot bars and/or T-slot light bars together through the T-slot interconnects.

5 Claims, 6 Drawing Sheets

(56) References Cited

U.S. PATENT DOCUMENTS

| | | | | |
|---|---|---|---|---|
| 7,600,724 B2* | 10/2009 | Nelson | ................... | F16L 3/127 |
| | | | | 248/68.1 |
| 8,454,259 B2* | 6/2013 | Oetlinger | .............. | E05D 5/0238 |
| | | | | 403/231 |
| 9,341,206 B2* | 5/2016 | Rouleau | ................... | H02G 3/30 |
| 9,599,136 B2* | 3/2017 | Rixen | .................... | F16B 7/187 |
| 9,882,365 B2* | 1/2018 | Sylvester | ................ | F16B 2/065 |
| 10,151,406 B2* | 12/2018 | Netke | ..................... | B60R 16/08 |
| 10,724,569 B2* | 7/2020 | Windfeldt | ............... | F16B 33/02 |
| 11,725,681 B2* | 8/2023 | Fluhrer | ................... | F16B 21/02 |
| | | | | 403/348 |
| 2005/0141984 A1* | 6/2005 | Gombert | ................ | F16B 21/02 |
| | | | | 411/349 |
| 2010/0102011 A1* | 4/2010 | Blum | ................... | F16B 37/045 |
| | | | | 211/8 |
| 2011/0132853 A1* | 6/2011 | Drobot | ................. | A47F 5/0853 |
| | | | | 211/183 |

* cited by examiner

T-SLOT BAR INTERCONNECT SYSTEM

RELATED APPLICATION

This application is a continuation-in-part of the co-pending U.S. patent application Ser. No. 17/300,050, filed Feb. 16, 2021 and titled "T-SLOT BAR INTERCONNECT SYSTEM", which claims priority under 35 U.S.C. § 119(e) from the U.S. provisional patent application Ser. No. 62/995,891, filed on Feb. 18, 2020 and titled "T-SLOT BAR INTERCONNECT SYSTEM", the contents of which are both hereby incorporated by reference.

FIELD OF THE INVENTION

The invention is related to a system to connect T-slot bars together, install T-bar slot structure to walls or ceilings and/or attach electronic accessories to T-slot bar structures. More particularly, the present invention is related to T-slot interconnects that are used to construct structures from T-slot bars including LED grow-light systems.

BACKGROUND

T-slot bars are generally extruded bars formed from metal. However, T-slot bars can also be formed from plastics, fiberglass and other suitable materials. T-slot bars have been used to from skeletal structures on walls to provide bracing for electrical and plumbing installations and can be interconnected together to form structures using nut/bolt-type of interlocking mechanisms. Aluminum T-slot bars are particularly useful from building larger structure on walls, ceilings and/or build suspended structures for supporting LED-grow lighting.

Grow-lights are used for horticulture, indoor gardening, plant propagation, and food production, including indoor hydroponics and aquatic plants. Although most grow-lights are used on an industrial level, they can also be used in households.

SUMMARY OF INVENTION

The present invention is direct to a quick interconnect system for connecting T-slot bars and T-slot light bars together and/or installing T-slot bar structures to walls or ceilings and/or attaching electronic accessories to the T-slot bar structures.

The quick interconnect system of the present invention utilizes T-slot interconnects. A T-slot interconnect includes body portion with two substantially orthogonally and elongated interlock tabs positioned on opposed sides of the body portion. In operation, one of the elongated interconnect tabs is fitted into a T-slot channel of a T-slot bar and is rotated through the body portion, such that the elongated interconnect tab is locked within the T-channel of the T-slot bar.

In accordance with an embodiment of the invention, the remaining elongated interconnect tab is placed into a T-channel of a second T-slot bar and the second T-slot bar is rotated such the remaining elongated interconnect tab is locked within the T-channel of the second T-slot bar to build a T-slot bar structure.

Alternatively, the two substantially orthogonally and elongated interlock tabs of a T-slot interconnect are placed within T-channels of two orthogonally positioned T-slot bars. The T-slot interconnect is then rotated through a body portion of the T-slot interconnect to secure the two substantially orthogonally and elongated interlock tabs within the T-channels of the two orthogonally positioned T-slot bars and, thereby, secure the T-slot bars in their respective orthogonal position. The T-slot interconnect is rotated through a body portion using a extended clip, hook, cable harnesses or other structure and/or a tool or a wrench, such as described below.

In further embodiments of the invention the T-slot interconnect has an extended clip, hook, harnesses or other connect structure attached to, for example, the body portion of the T-slot interconnect. The extended clip, hook, harnesses or other structure can be used for supporting or securing wiring or cables. Also, the extended clip, hook, harnesses or other structure can be used as a lever to rotate the T-slot interconnect to secure elongated interlock tabs within the T-channels of T-slot bars, such as described above.

In still further embodiments of the invention the body portion of a T-slot interconnect is formed from two hexagonally shaped parts or portions that are capable of being independently rotated with respect to each other using, for example with a wrench of other suitable tool. The two hexagonally shaped parts or portions are coupled to the opposed and elongated interconnect tabs and for independently rotating the opposed and elongated interconnect tabs and securing the opposed and elongated interconnect tabs within T-channels of T-slot bars, as described above.

There are also a number of applications where T-slot interconnects are attached to one T-slot bar through one of the elongated interconnect tabs. For example, a T-bar interconnect can have mounting features or structures for attaching the T-bar interconnect to a wall, a ceiling ceiling or other structure for supporting an attached T-slot bar or T-slot bar structure. A T-bar interconnect can also be installed in one T-slot bar for holding cables/wires and/or supporting electronics while being attached to the T-slot bar.

The T-slot interconnects described above and below are used to secure elongated light bars with T-slots, referred to herein as T-slot light bars, to T-slot bars and build LED grow-light structures or grow-light canopies. Addition features of LED grow-light structures or grow-light canopies are described in U.S. patent application Ser. No. 16/501,984, titled "DUAL-LAYER LED GROW-LIGHT SYSTEM, the contents of which are hereby incorporated by reference.

DESCRIPTION OF THE INVENTION

Figure 1A:
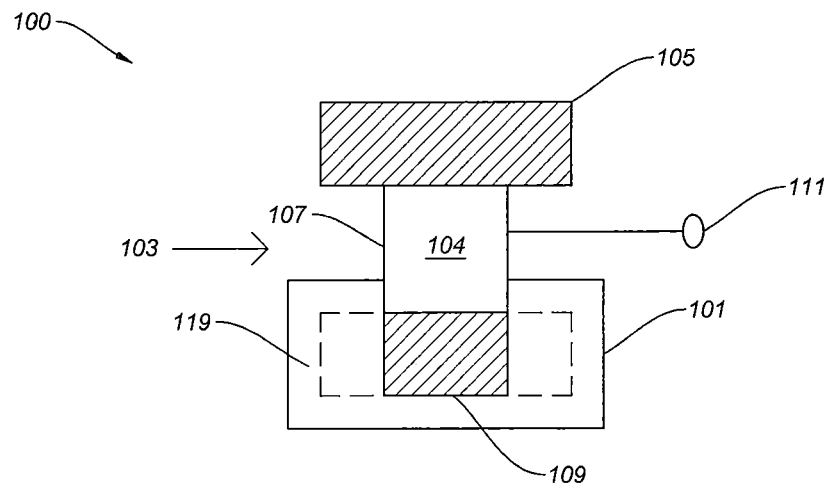
FIGS. 1A-B show schematic representations of a T-slot interconnect for securing to a T-slot bar, in accordance with the embodiments of the invention.

The system utilizes a T-slot interconnects. A T-slot interconnect 103 includes body portion 104 and two orthogonally elongated and opposed interlock tabs 105 and 109 positioned on opposed sides of the body portion 104. In operation one of the elongated interconnect tabs 109 is fitted into a T-slot channel 119 of a T-slot bar 101 and the body portion 104 is turned, as indicated by the arrow 112, such that the elongated interconnect tab 109 is locked within the T-channel 119 of the T-slot bar 101.

Figure 2A:
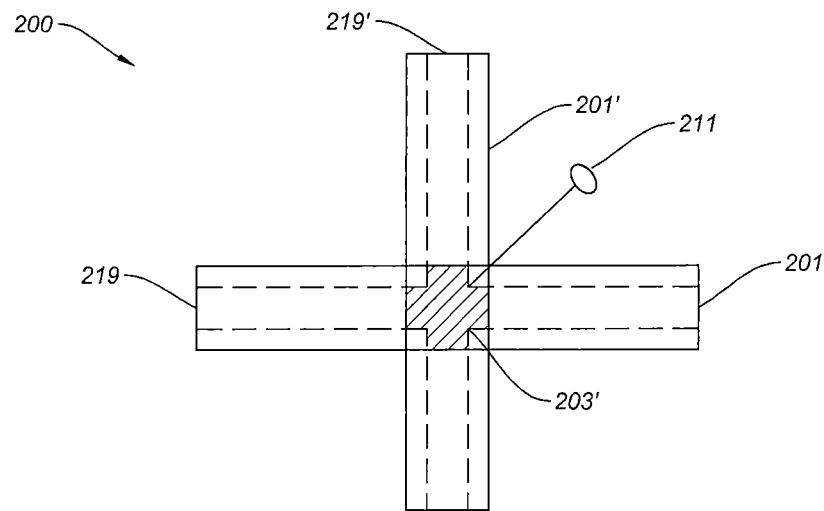
FIGS. 2A-B illustrate representations of a T-slot interconnect for orthogonally connecting two T-slot bars with opposed and elongated interlock tabs that secure within T-channels of the T-slot bars, in accordance with the embodiments of the invention.

In other operations, the two orthogonally elongated interlock tabs 105 and 109 of a T-slot interconnect 103 or 203 are placed into orthogonally positioned T-channels 219 and 219' of two orthogonally positioned T-slot bars 201 and 201' (FIG. 2A). Then the interconnect 103 or 203 is rotated through the body portion 104 using a extended clip, hook, harnesses or other structure 111 or 211 and thereby secure the of two orthogonally positioned T-slot bars 201 and 201' in their positions.

Alternatively, after the elongated interconnect tabs 109 is fitted into a T-slot channel 119 and secured therein, the remaining elongated interconnect tab 105 is placed into a T-channel 219' of a second T-slot bar, such as 201' (FIG. 2A) and the second T-slot bar 201 is rotated such the remaining elongated interconnect tab is locked or secured within the T-channel 219' of the second T-slot bar 201'. The structure 111/211 attached to the body portion 104 the T-slot interconnect 103/203 cab be used for supporting or securing wiring or cables.

Figure 1B:
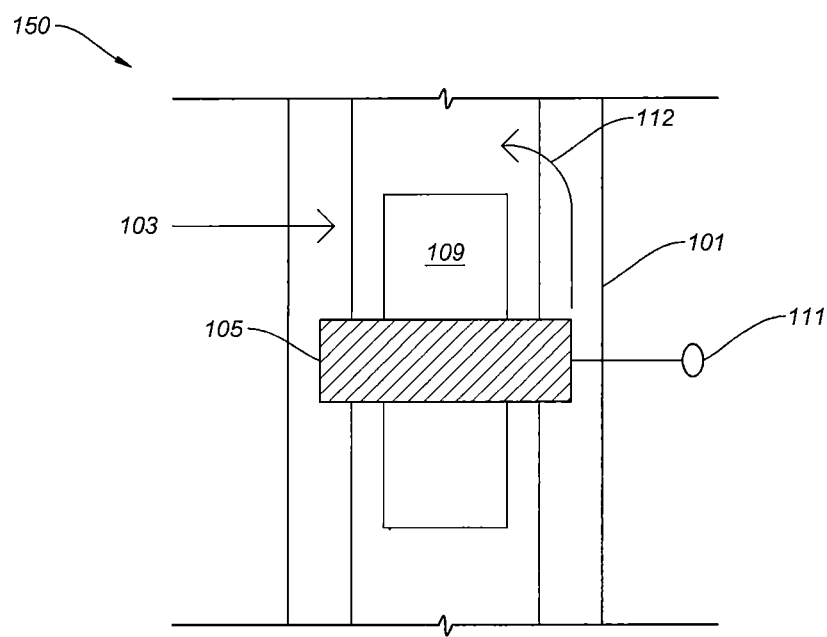
Figure 2B:
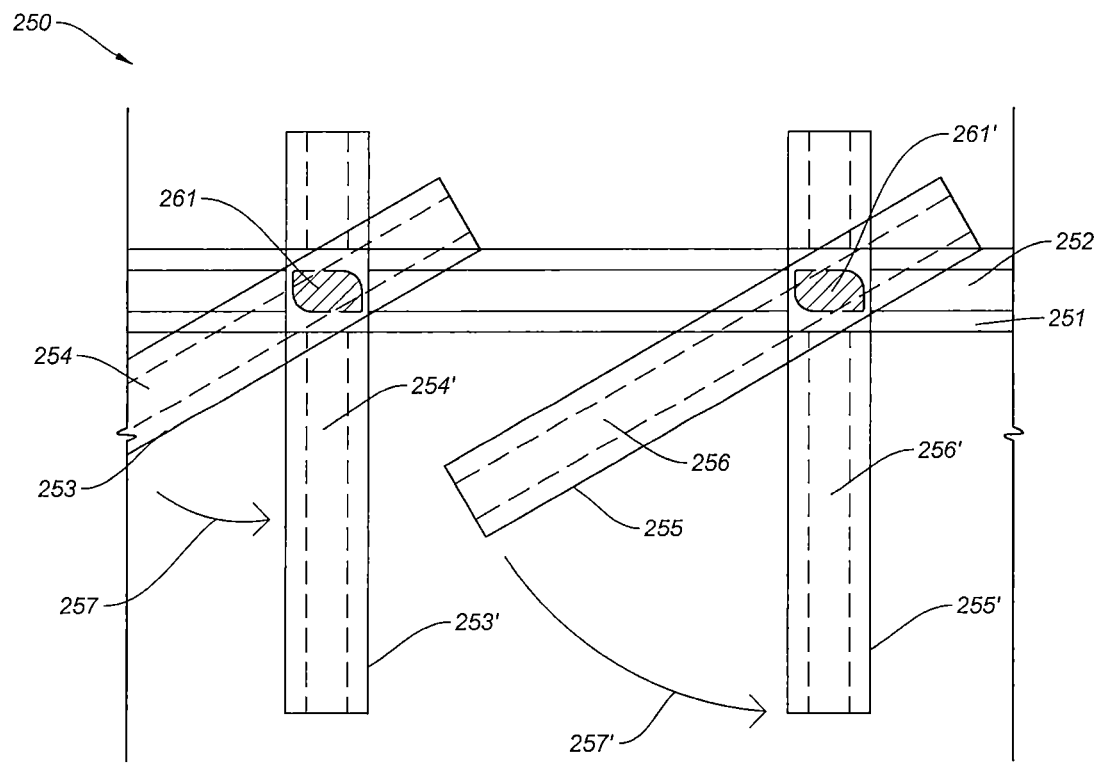
Figure 3B:
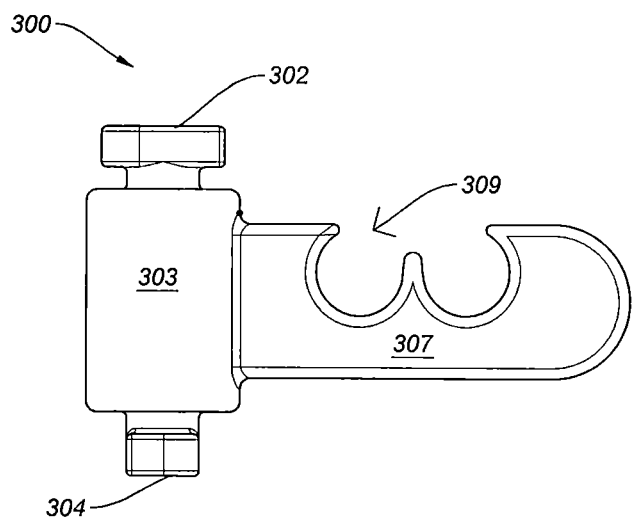
FIGS. 3A-D shows detailed engineering drawings of a T-slot interconnect with a support structure attached to a body portion of the T-slot interconnect, in accordance with the embodiments of the invention.
Figure 3A:
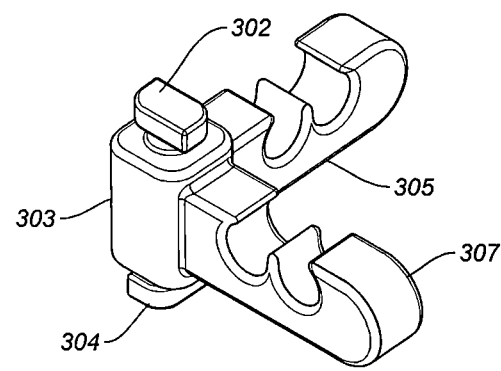
Figure 3C:
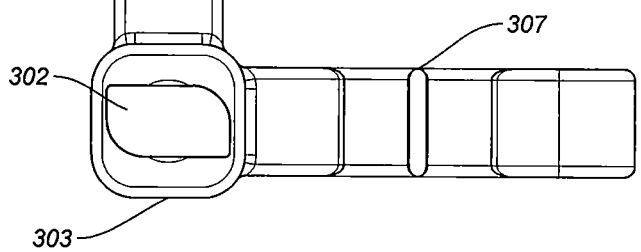
Figure 3D:
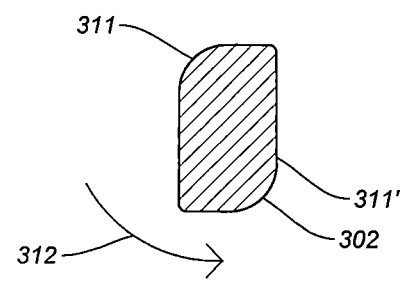

Regardless, of how the T-slot interconnects are rotated relative to a T-channel of a T-slot bar, FIG. 2B illustrates how to build a T-bar structure 250 using T-slot bars and the T-slot interconnects of the present invention. In operation elongated interlock tabs 105 and 109 (FIGS. 1A-B) of T-slot interconnects 261 and 261' are places within T-channels 252, 254'/256' of orthogonally positioned T-slot bars 251 and 253'/255'. The T-slot interconnects 261 and 261' are then turned, such the elongated interlock tabs 105 and 109 turn within the T-channels 252, 254' and 256' and are secured therein to form the T-slot bar structure 250.

Alternatively, one of the elongated interlock tabs from each of the T-slot interconnects 261 and 261' are place within a T-channel 252 of a T-slot bar 251 and secured therein by turning the T-slot interconnects 261 and 261'. Then the remaining elongated interlock tabs from each of the T-slot interconnects 261 and 261' are positioned within T-channels 254 and 256 of the T-slot bars 253 and 255 and the T-slot bars 253 and 255 are rotated as indicated by the arrows 257 and 257' to secure the remaining elongated interlock tabs from each of the T-slot interconnects 261 and 261' within the T-channels 254 and 256 of the T-slot bars 253 and 255 to form the T-slot bar structure 250.

FIGS. 3A-D shows detailed engineering drawings of a T-slot interconnect 300 with support structures 305 and 307 attached to a body portion 303 of the T-slot interconnect 300 for securing or holding wires and/or cables in clip portions 309, in accordance with the embodiments of the invention. The T-slot interconnect 300 has two opposed and orthogonally elongated interlock tabs 302 and 304 that are fitted into T-channels of T-slot bars and/or T-slot light bars. The opposed and orthogonally elongated interlock tabs 302 and 304 preferably have opposed curved edges 311 and 311' that allow the T-slot interconnect 300 to be preferentially turned or rotated in one rotational direction 312 with T-channels of T-slot bars and/or T-slot light bars to secure the T-slot bars and/or T-slot light bars together through the T-slot interconnect 300, as described in detail above. The support structures 305 and 307 can act as handles to leverage or assist turning or rotating the opposed and orthogonally elongated interlock tabs 302 and 304 within T-slot channels and can hold or secure wiring or cables in a clip portion 309.

In accordance with an embodiment of the invention the T-slot interconnect 300 is a molded as a single unit (monolithic) with no detachable or individually movable portions. The T-slot interconnect 300 has a body portion 303 with a first interlock tab 302 protruding from the body portion 303 by a first rounded neck portion. The first interlock tab 302 and the first rounded neck portion are fixed to the body portion 303 or are monolithic with respect to the body portion 303. The first interlock tab 302 has opposed curved edges 311 and 311". On an opposed side of the body portion 303 portion there is a second interlock tab 304 protruding from the body portion 303 by a second rounded neck portion. The second interlock tab 304 and the second rounded neck portion are fixed to the body portion 303 or are monolithic with respect to the body portion 303. The second interlock tab 302 also has opposed curved edges, such as the opposed curved edges 311 and 311" on the first interlock tab 302 and the first interlock tab 301 and the second interlock tab 304 are orthogonally elongated with respect to each other. In operation, placing the first interlock tab 302 in a T-channel of a first T-slot bar, placing the second interlock tab 304 within a T-channel of a second T-slot bar and rotating the body portion 303, as indicated by the arrow 312, also rotates that fixed and attached first interlock tab 302 within the T-channel of the first T-slot bar and simultaneously rotates fixed and attached second interlock tab 304 within T-channel of a second T-slot bar to thereby secure the first T-slot bar and the second T slot-bar together through the T-slot interconnect.

Figure 4A:
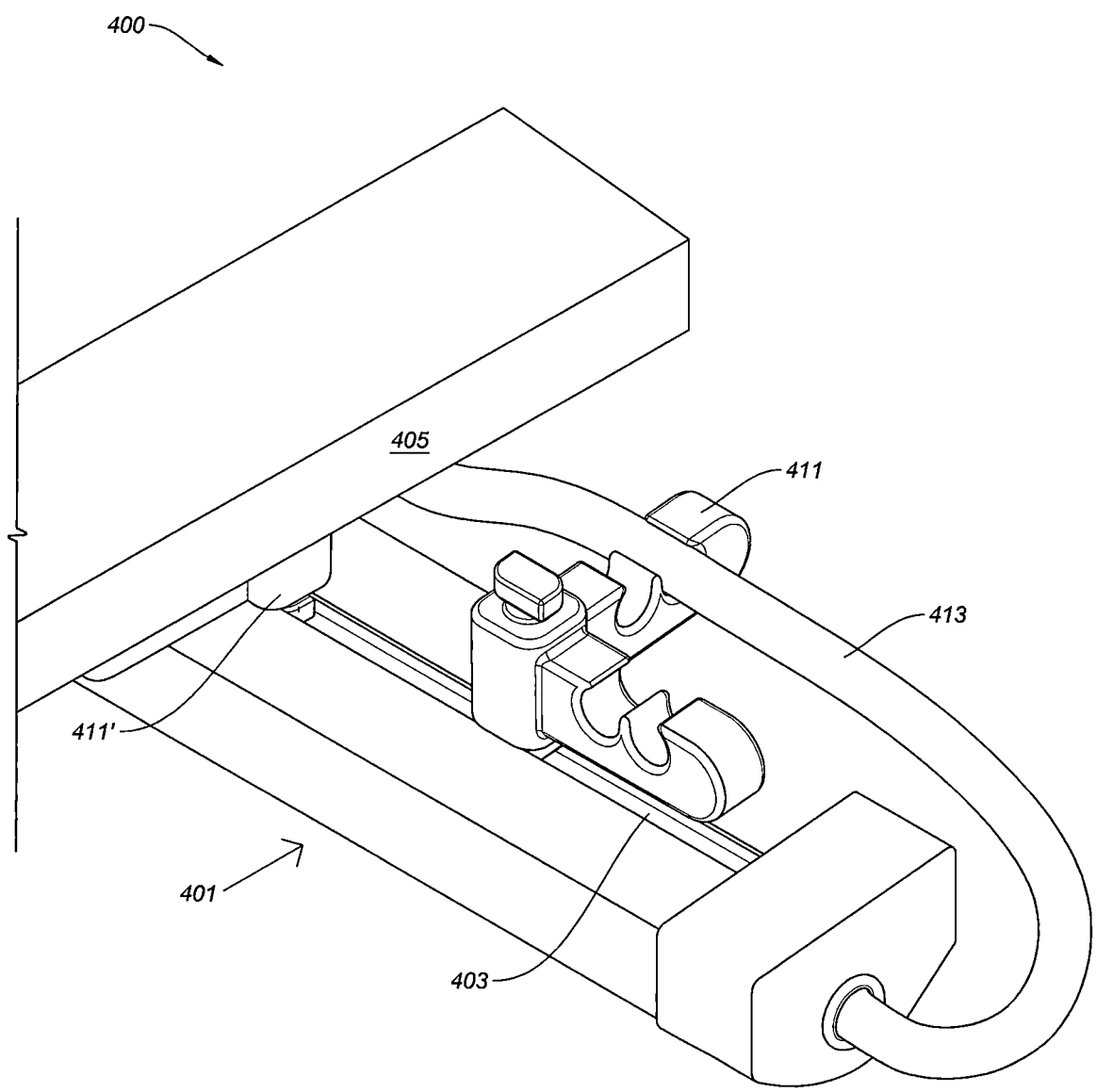
FIGS. 4A-C illustrate T-slot interconnects used to form T-slot bar structures and securing T-slot light bars to the T-slot bar structures, in accordance with the embodiments of the invention.

FIG. 4A shows a view of a T-bar structure 400 with a T-slot interconnect 411 (300; FIGS. 3A-D) with an elongated interlock tab secured within a T-channel 403 of a T-slot light bar 401 and with support structure securing and holding a cable 413 for powering the T-slot light bar 401. The T-slot bar structure 400 also has a T-slot interconnect 411 with elongated interlock tab secured within T-channel 403 of the T-slot light bar 401 and a T-channel of a T-slot bar 405 for securing the T-slot light bar 401 to the T-slot bar 405 of the T-slot bar structure 400.

Figure 4B:
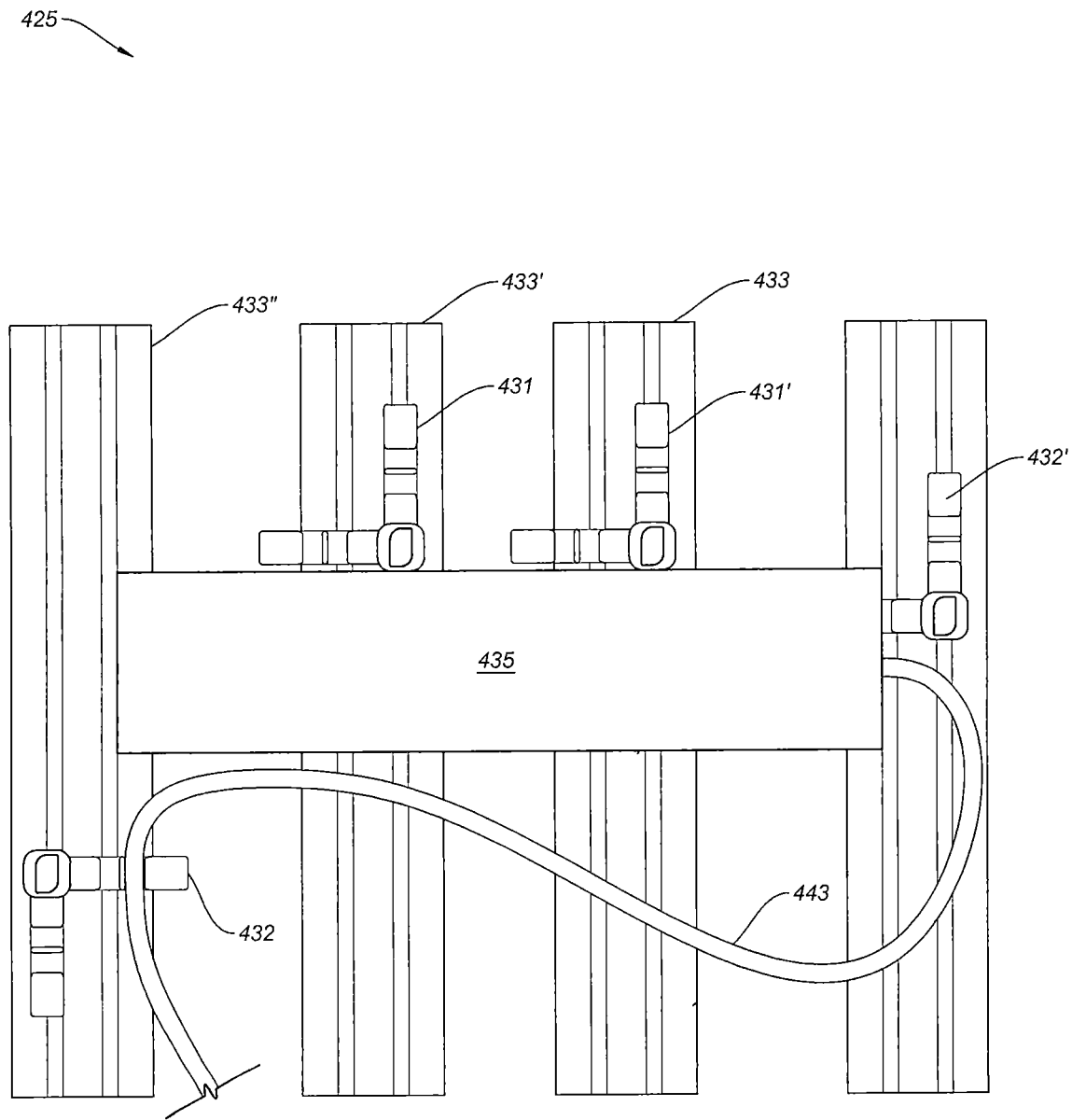

FIG. 4B shows a view of a T-slot bar structure 425 formed from multiple T-slot light bars 433, 433' and 433". The T-slot bar structure 425 includes an LED driver 435 that is secured in positioned through two T-slot interconnects 431 and 431' with elongated interlock tabs secured within T-channels of the T-slot light bars 433 and 433'. The T-bar structure 425 also includes a T-slot interconnects 432 and 432' secured within T-channels of the T-slot light bars 433" and 434 for holding or supporting power cables, such as the power cable 443.

Figure 4C:
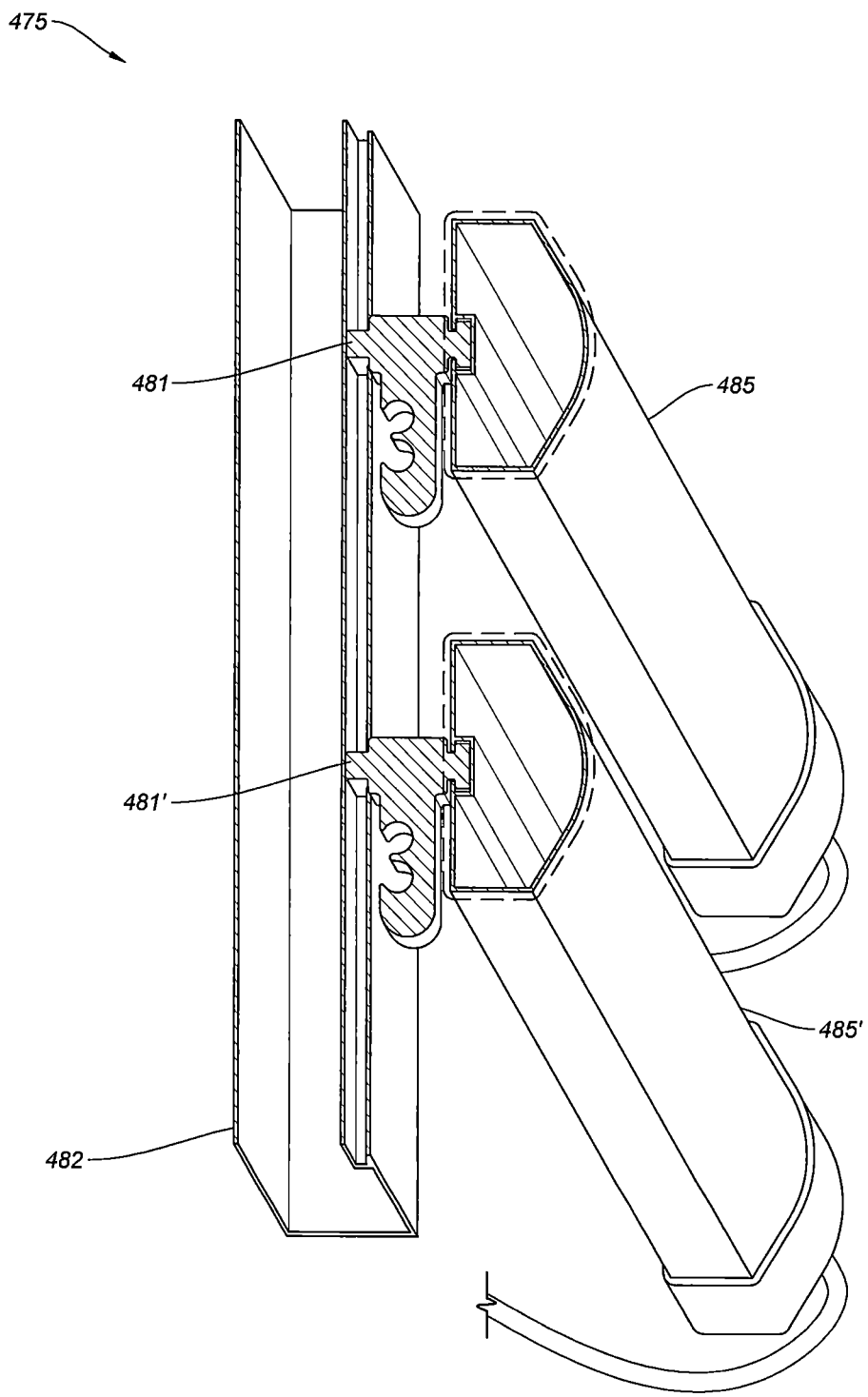

FIG. 4C shows a view of a T-slot bar structure 475 formed from T-slot light bars 485 and 485' and a T-slot bar 482. The T-slot light bars 485 and 485' are secured to the T-slot bar 482 via T-slot interconnects 481 and 481' (300; FIGS. 3A-D). Again, the T-slot interconnects 481 and 481' are secured within T-channels of the T-slot light bars 485 and 485' and/or T-slot bar 482 by elongated interlock tabs, as described above.

In further embodiments of the invention, one of the elongated interlock tabs 105 or 109 (FIGS. 1A-B) of the T-slot interconnect 103 is replaced by a loop structure, a hook structure or bracket structure 111 for mounting for attaching the T-slot interconnect 103, and any T-slot bar attached thereto, to a wall, ceiling or other support structure. In still further embodiments of the invention the body portion 104 of the T-slot interconnect 103 is formed from two hexagonally shaped parts or portions that are capable of being rotated independently and with respect to each other using, for example, a wrench, to secure the one or more of the interconnect tabs 105 and 109 within T-channels of T-slot bars or T-slot light bars.

The present invention has been described in terms of specific embodiments incorporating details to facilitate the understanding of the principles of construction and operation of the invention. As such, references herein to specific embodiments and details thereof are not intended to limit the scope of the claims appended hereto. It will be apparent to those skilled in the art that modifications can be made in the embodiments chosen for illustration without departing from the spirit and scope of the invention.

What is claimed is:

1. A T-slot interconnect comprising:
   a) a body portion with attached support structures for securing or holding wires; and
   b) a first interlock tab with opposed curved edges and that is fixed to and positioned a side of the body portion;
   c) a second interlock tab with opposed curved edges and that is fixed to and positioned an opposed side of the body portion relative to the first elongated interlock tab, wherein first interlock tab and the second interlock tab are orthogonally elongated with respect to each other and wherein placing the first interlock tab in a T-channel of a first T-slot bar, placing the second interlock tab within a T-channel of a second T-slot bar and rotating the body portion of the T-slot interconnect secures the first T-slot bar and the second T slot-bar together through the T-slot interconnect.

2. A T-slot interconnect for making T-slot bar structures, the T-slot interconnect comprising:
   a) a body portion with attached support structures for securing or holding wires; and
   b) two interlock tabs each with opposed curved edges and that are orthogonally elongated with respect to each other and that are positioned on opposed sides of the body portion for placing into T-channels of T-slot bars and wherein rotating the body portion of the T-slot interconnect rotates the interlock tabs within the T-channels securing the interlock tabs within the T-channels and thereby securing the T-slot bars together through the T-slot interconnect, wherein the body portion and the two interlock tabs are monolithic.

3. A T-slot interconnect comprising:
   a) a body portion; and
   b) a first elongated interlock tab fixed to one side of the body portion for placing into a T-channel of a first T-slot bar and/or a T-slot light bar, wherein rotating the body portion secures the T-slot interconnect to the first T-slot bar and/or the T-slot light bar; and
   a loop structure, a hook structure or a bracket structure for mounting for attaching the T-slot interconnect, and any T-slot bar and/or a T-slot light bar attached thereto, to a wall, ceiling or other support structure.

4. The T-slot interconnect of claim 3, with support structures attached to the body portion of the T-slot interconnect for securing or holding wires and/or cables in clip portions.

5. The T-slot interconnect of claim 3, further comprising a second elongated interlock tab fixed to an opposed side of the body with respect to the side first elongated interlock tab, wherein placing the second elongated interlock tab within a T-channel of a second T-slot bar and/or a T-slot light bar and the rotating of the body portion secures the first T-slot bar and/or the T-slot light bar and the second T-slot bar and/or the T-slot light bar together through the T-slot interconnect.

* * * * *